United States Patent
Kampmann et al.

(10) Patent No.: US 7,657,672 B2
(45) Date of Patent: Feb. 2, 2010

(54) PACKET SCHEDULING FOR DATA STREAM TRANSMISSION

(75) Inventors: Markus Kampmann, Aachen (DE); Uwe Horn, Aachen (DE); Joachim Sachs, Aachen (DE); Jan Kritzner, Aachen (DE)

(73) Assignee: Telefonaktiebolaget L M Ericsson (PUBL), stockholm (SE)

( * ) Notice: Subject to any disclaimer, the term of this patent is extended or adjusted under 35 U.S.C. 154(b) by 0 days.

(21) Appl. No.: 10/597,457

(22) PCT Filed: Jan. 30, 2004

(86) PCT No.: PCT/EP2004/000836

§ 371 (c)(1), (2), (4) Date: Jul. 2, 2008

(87) PCT Pub. No.: WO2005/076539

PCT Pub. Date: Aug. 18, 2005

(65) Prior Publication Data

US 2008/0256272 A1  Oct. 16, 2008

(51) Int. Cl.
*G06F 3/00* (2006.01)
*G06F 13/36* (2006.01)

(52) U.S. Cl. .................. 710/52; 710/310
(58) Field of Classification Search .......... 710/52–57, 710/310
See application file for complete search history.

(56) References Cited

U.S. PATENT DOCUMENTS

| | | | | |
|---|---|---|---|---|
| 4,470,304 A * | 9/1984 | Nusbickel et al. | | 73/611 |
| 5,854,887 A * | 12/1998 | Kindell et al. | | 725/86 |
| 6,105,086 A * | 8/2000 | Doolittle et al. | | 710/52 |
| 6,260,090 B1 * | 7/2001 | Fuhs et al. | | 710/107 |
| 6,408,341 B1 * | 6/2002 | Feeney et al. | | 709/250 |
| 6,480,911 B1 * | 11/2002 | Lu | | 710/54 |
| 7,251,702 B2 * | 7/2007 | Lee et al. | | 710/240 |
| 7,464,180 B1 * | 12/2008 | Jacobs et al. | | 709/240 |
| 2004/0013124 A1 | 1/2004 | Oliver et al. | | |
| 2004/0243900 A1 * | 12/2004 | Henkel | | 714/742 |

OTHER PUBLICATIONS

Feng W et al "A priority-Based Technique for the Best-Effort Delivery of Stored Video" SPIE Conference on Multimedia Computing and Networking 1999, Jan. 25, 1999, pp. 286-300. XP002302919 San Jose, California, USA cited in the application p. 290, line 9-line 13 p. 291, line 1-line 7 p. 291, line 20-line 21 p. 294, line 19-p. 295, line 3.

* cited by examiner

*Primary Examiner*—Christopher B Shin

(57) ABSTRACT

The invention relates to transmitting data elements of a data stream based on a priority and target buffer fill levels at a receiving device. A transmitter controller transmits data elements of a data element class with a highest priority first, for reaching an associated buffer fill level and then turns to data elements of successively lower priorities, until the available bandwidth is exhausted.

32 Claims, 8 Drawing Sheets

PACKET SCHEDULING FOR DATA STREAM TRANSMISSION

FIELD OF THE INVENTION

The present invention relates to transmitting data elements of a data stream based on priorities to a receiving device.

BACKGROUND OF THE INVENTION

With the increased proliferation of data processing devices and with increased availability of computer networks for data exchange an increasing number of services can be obtained using for example home computer equipment or similar.

Generally, the provision of a service via a computer network requires a transmission device or server for transmitting data pertaining to the service and requires a receiving device or client for receiving the data from the server. A user operating the receiving device may then appropriately take notice of the received data, e.g. view the received data on a display, or listen to audio data. Interactive services enable users to control the service provision via entering information at the client for transmission to the server, thus enabling the server to appropriately configure the service provision.

Providing a service over a computer network may require the exchange of substantial amounts of data, for example image or audio data, and as the network bandwidth available for the streaming is generally limited, data compression or coding is applied. These techniques reduce the amount of data to be transmitted via the network, preferably without substantially degrading the quality of the data obtained at the receiver. Many data compression techniques for image data including video and audio data are available today.

One group of services available over computer networks includes the transmission of data streams from a transmitting device to a receiving device. The data stream may incorporate a sequence of images, such as video sequence, or may incorporate audio data or both. For example, a user at a client computer device may obtain a steaming service by appropriately selecting an offered data stream, e.g. by clicking on a corresponding icon on a browser screen. The user can view a browser page on a client display including for example a selection of text elements accompanied by a tag offering a corresponding video sequence. The user can then select a desired tag and a selection instruction will be transmitted to a server, requesting the server to initiate transmission of a corresponding video data stream to the client device. The client device in turn will then display the video sequence.

As a data stream usually contains a large amount of data to be transmitted on the relatively strict time constraints, e.g. for maintaining real time requirements, efficient data compression techniques or codes are required.

Streaming applications generally involve the use of predictive coding. A data stream is usually formed by a sequential transmission of a number of data elements, each of the data elements representing a portion of the information to be streamed to the receiving device. Predictive coding includes any data compression or coding technique, where at least some of the data elements refer to or require information transmitted in other data elements. A data element requiring information from another data element can therefore be decompressed at the receiving device only to full extent, if the required further data element or data elements are available at the receiving device. For example, predictive coding may include a statistical estimation procedure where future random variables of the data stream are estimated or predicted from past and present observable random variables.

Streaming applications between computers may be hampered by a lack of service support. Generally it is difficult to reserve a bandwidth, e.g. on a computer network, for the streaming application and for this reason a transmitting device may be unable to transmit the complete streaming information to the receiving device in a timely manner. Moreover, in a streaming application data elements usually contain a time stamp indicating a temporal position within the stream. Consequently, for maintaining real time conditions, a data element must be available at the receiving device at a certain point in time, to allow a timely presentation of the data elements. If not all data elements of the streaming application can be transmitted in a timely manner to the receiving device, a video, audio or other data stream may be interrupted or fully terminated.

In an environment with a limited available bandwidth it is thus required to carefully schedule the individual data elements for transmission to the receiving device, in order to maintain the highest possible quality of the data stream. Further, it is required to appropriately scale down a required bandwidth for the data stream transmission while accepting a more or less severe reduction of the quality of the stream but avoiding dropouts or termination of services.

As in a limited bandwidth environment it may not be possible to transmit all data elements of the data stream, a careful selection of the most important ones of the data elements for the data stream should be performed, in order to avoid the dropping of highly important data elements when the available bandwidth is exhausted. Ideally, only the least important data packets should be dropped upon reaching a bandwidth limitation.

A simple scheduling algorithm is the so-called earliest deadline first (EDF) algorithm proposed by C. L. Liu and J. W. Layland, "Scheduling algorithms for multiprogramming in a hard-real-time environment,", Journal of the ACM (JACM), vol. 20, no. 1, pp. 46-61, January 1973. In this approach data elements are transmitted in their presentation order, in order to make sure that the data elements arrive in a timely manner at the receiving device. In another approach described in W. chi Feng, M. Liu, B. Krishnaswami, and A. Prabhudev, "A priority-based technique for the best-effort delivery of stored video," in SPIE/IS&T Multimedia Computing and Networking 1999, January 1999, priority values are assigned to the data elements, indicating the relative importance of frames. A priority-based transmission scheme minimizing a weighted loss of data elements has been described in reference (4): R. L. Givan, E. K. P. Chong, and H. S. Chang, "Scheduling multiclass packet streams to minimize weighted loss," in Queueing Systems, vol. 41, no. 3, January 2001, pp. 241-270. In a priority-based scheduling the highest priority data elements are transmitted and only after transmission of the highest priority packets a transmission turns to some of the next lower priority data elements. Accordingly, a transmission order can be different from a playout order at the receiving device. If in this priority-based scheme an available bandwidth is not sufficient, the data elements with lower priorities are dropped from the transmission queue, as the bandwidth limitation is reached. In a practical case the data elements with lower priorities will be dropped due to reaching the above-mentioned playout time limit, after which a time representation of the data element is not any longer possible. This algorithm assures that always data elements of higher priorities are transmitted first and thus available at the receiving device and, if the bandwidth is insufficient for transmitting all data elements, that lower priority data elements are skipped. This will lead to a more or less severe degradation of the overall quality of the stream. However, this algorithm has drawbacks during start-up conditions, as it will take relatively long periods of time until the data packets with lower priorities are transmitted.

SUMMARY OF THE INVENTION

It is therefore an object of the invention to improve a scheduling of data elements of a data stream for transmission to a receiving device based on improved priority assignment.

According to a first embodiment of the invention a transmission device for transmitting data elements of a data stream based on priority to a receiving device, comprising a transmitter controller for obtaining data elements of a plurality of data element classes, each of the data element classes associated with a priority; a buffer fill level detector for obtaining information on buffer fill levels of a data element buffers at the receiving device for a plurality of data element classes; and wherein the transmitter controller is adapted to transmit data elements of a data element class with a first priority for reaching the associated buffer fill level and, if the buffer fill level detector determines that the buffer fill level of the data element class with the first priority is reached, to transmit data elements of a data element class with a second priority, the second priority being lower than the first priority. Accordingly, the embodiment enables a transmission of data elements in accordance with priority under consideration of predefined buffer fill levels for improved accommodation to for example a condition of a transmission medium.

According to an advantageous embodiment, the transmitter controller is adapted to transmit data elements of data element classes with further priorities, the further priorities being successively lower, if the buffer fill level detector determines that the buffer fill level of the data element class with a respective priority is reached. Accordingly, data elements of successively lower priority classes can be transmitted to the receiving device to reach associated buffer fill levels until for example the available bandwidth is exhausted. Only lower priority data elements are discarded.

According to another embodiment the transmitter controller adjusts a transmission rate of the data elements of each respective data element class for maintaining the associated buffer fill level.

If a buffer fill level of a data element class cannot be reached due to reaching a bandwidth limitation, the transmitter controller may drop data elements of all data element classes with lower priorities.

According to another embodiment the buffer fill level detector at the transmitting device is adapted to estimate buffer fill levels at the receiver. Thus, according to the embodiment the transmitting device does not need a back channel from the receiving device for reporting achieved buffer fill levels.

Alternatively, or in addition thereto the buffer fill level detector periodically receives a messages from the receiver indicating the buffer fill levels at the receiver.

Advantageously, the buffer fill levels correspond to a respective playout length of time of the data elements and wherein the playout lengths of time are selected to decrease with decreasing priority. This allows reflecting the individual importance of the data elements in the data element classes, as, for example during a transmission link interruption, data elements of higher importance are available for longer playout length of time.

A link loss duration determining means may determine durations of link losses within a predetermined time period and may be provided for computing a mean link loss duration and the playout length of time may be selected based on the computed mean duration of a link loss. The playout length of time of the data element class with the highest priority may be set to match or to exceed the maximum detected link loss duration during the predetermined time period.

According to another embodiment the target buffer fill levels are increased with the lapse of transmission time of the data stream after a start up condition or a rebuffering event.

According to another embodiment the transmitter controller determines a time out limit for each data element, the time out limit indicating a latest allowable point in time for transmitting a data element to meet real time requirements, and may drop data elements where the timeout limit is exceeded. Accordingly, data elements exceeding their timeout limit may for example be removed from a transmission queue.

According to another embodiment, if all buffer fill levels can be reached or maintained, the transmitter controller is adapted to switch to an earliest deadline first transmission mode. Accordingly, a switching to a simple earliest deadline first transmission mode may be executed if sufficient bandwidth for transmitting all data elements of all data element classes becomes possible.

If the transmitter controller is in the earliest deadline first transmission mode, and if at least one buffer fill level cannot be maintained, the transmitter controller may switch back to the priority-based transmission. Accordingly, if the bandwidth available for transmitting the data stream becomes again lowered, the priority-based transmission may again be executed. Moreover, if a buffer fill level value is below a predetermined threshold, the transmitter controller may switch to an earliest deadline first transmission mode. Thus, if an overall measure for a buffer fill level becomes unacceptably low, the earliest deadline first transmission mode may be used. Still further, the transmitter controller may switch to an earliest deadline first transmission mode upon a transmission start event and/or upon a re-buffering event.

According to another embodiment of the invention a receiving device for receiving data elements of a data stream based on priority from a transmitting device may comprise a receiver controller for receiving data elements of a plurality of data element classes, each of the data element classes associated with a priority; a plurality of data element buffers provided for storing data elements of each of the data element classes; and a buffer fill level reporter for reporting information on buffer fill levels of data element buffers at the receiving device for the plurality of data element classes to the transmitting device, for enabling a transmitter controller at the transmitting device to transmit data elements of a data element class with a first priority so that the associated buffer fill level is reached and, if the buffer fill level of that data element class with the first priority is reached, to transmit data elements of a data element class with a second priority, the second priority being lower than the first priority.

According to another embodiment of the invention, a method for transmitting data elements of a data stream based on priority to a receiving device comprises obtaining data elements of a plurality of data element classes, each of the data element classes associated with a priority; obtaining information on buffer fill levels of data element buffers at the receiving device for the plurality of data element classes; and transmitting data elements of a data element class with a first priority for reaching an associated buffer fill level and, if the buffer fill level of the data element class with the first priority is reached, to transmit data elements of a data element class with a second priority, the second priority being higher than the first priority.

Further embodiments of the invention are disclosed in further claims.

DETAILED DESCRIPTION OF THE PREFERRED EMBODIMENTS

In the following a first embodiment of the invention will be described with regard to FIG. 1.

Figure 1:
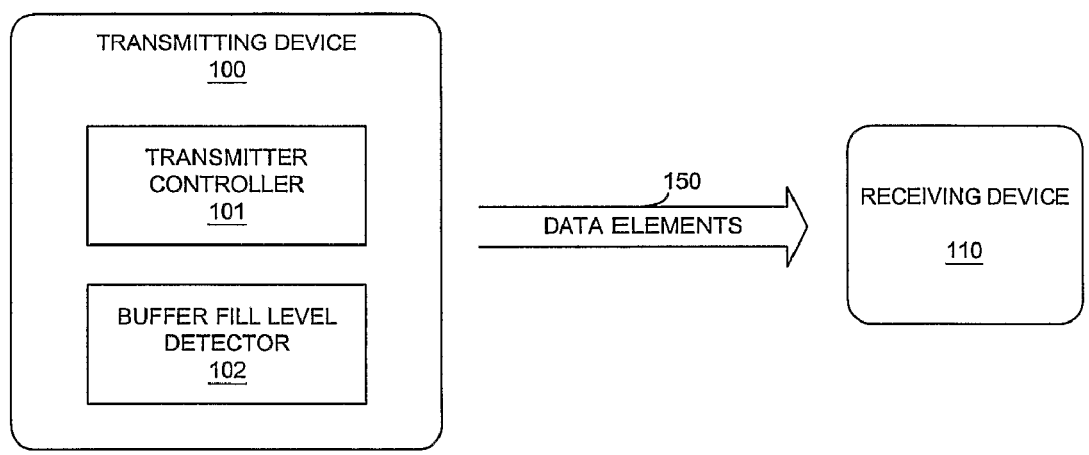
FIG. 1 illustrates elements of a hardware structure for transmitting data elements of a data stream based on priority to a receiving device according to an embodiment of the invention.

FIG. 1 illustrates elements of a hardware arrangement for transmitting data packets based on priority to a receiving device.

FIG. 1 schematically illustrates a transmitting device 100 for transmitting data elements of a data stream based on priority to a receiving device 110. The transmission of data elements from the transmitting device 100 to the receiving device 110 is illustrated at 150.

The transmitting device 100 includes a transmitter controller 101 for obtaining data elements of a plurality of data element classes, each of the data element classes being associated with a priority. Further, the transmitting device comprises a buffer fill level detector 102 for obtaining information on buffer fill levels for data element buffers at the receiving device for the plurality of data element classes. Moreover, the transmitter controller 101 is adapted to transmit data elements of a data element class with a first priority for reaching the associated buffer fill level and, if the buffer fill level detector determines that the buffer fill level of the data element class with the first priority is reached, to transmit data elements of a data element class with a second priority, the second priority being lower than the first priority. In the same manner, the transmitter controller may further transmit data elements of data element classes with further priorities, the further priorities being successively lower, if the buffer fill level detector determines that the buffer fill level of a data element class with a respective priority is reached.

Accordingly, the transmission device attends to the transmission of data elements based on their priority class and under consideration of a buffer fill level for that priority class at the receiving device. Highest emphasis will be put on the transmission of data elements having the highest priority class and only after having transmitted a sufficient number of data elements in the highest priority class for maintaining a corresponding target buffer fill level at the receiving device, the transmitting device will turn to the transmission of data packets having the second highest priority. Again, the transmitting device will then transmit data packets of the second highest priority class, until the corresponding target buffer fill level of the data packets of the second highest priority class is reached or maintained, and then the transmitting device will correspondingly attend to the transmission of data elements within gradually lower priority classes. The transmitting device will attend to successively lower priority classes until the available bandwidth is exhausted or until all data elements of all priority classes for obtaining the respective buffer fill levels have been transmitted.

In case the bandwidth is insufficient for transmitting all data elements according to the above scheme, data elements of the lower priority classes may be dropped. More precisely, according to an example, if a buffer fill level of a data element class cannot be reached due to reaching a bandwidth limitation, the transmitter controller drops data elements of all data element classes with priorities being lower than this data element class.

In a practical transmission environment the data stream may be partitioned into a time sequence of groups of data elements, and each of the time sequence of groups containing data elements of different priority classes. The transmitter control 101 may separately attend to the transmission of each group of data elements in accordance with the above scheme, i.e., may transmit data elements of a highest priority class of a group of data elements, in order to maintain the associated buffer fill level at the receiving device, and then successively turn to lower priority classes in this group of data elements and then turn to the transmission of another group of data elements of the time sequence of data element groups in the same manner.

The grouping of data elements into a time sequence of data element groups may be performed by always grouping a predetermined number of data elements of the temporal sequence of data elements of the data stream, or a temporal sequence of data elements grouped to achieve groups with the same amount of data, but possibly varying number of data elements. Combined approaches are possible.

In another example the entire data stream is considered to constitute a single group of data elements.

In another practical example, in any of the above cases, the data stream is processed at a rate that matches a desired playback speed of the data stream at the receiving device, e.g. a real time playback speed. Thus, data elements are handled at the transmitting device at a predetermined rate.

During a transmission operation of a data stream, the transmitter controller therefore has to handle or will encounter a sequence of data elements of individual priority classes and may store the data elements of the individual priority classes in different buffers, e.g., buffers with a first-in-first-out (FIFO) type of intermediate storage. Then, based on the above data element scheduling scheme, the transmitter controller attends to the transmission of the data elements of the individual priority classes. The transmitter controller will accordingly schedule a first number of data elements of the highest priority class for transmission to the receiving device, in order to maintain a buffer fill level at the receiving device for the first priority class. Preferably, the transmitter controller will first transmit the data elements of the highest priority class which arrive first, i.e., will have to be played back at the receiving device first. If the buffer fill level of the highest priority class is reached by transmitting data elements of the highest priority class, the transmitter controller turns to the buffer storing the data elements of the second highest priority class and subsequently two buffers for lower priority classes. If a target buffer fill level of a certain priority class cannot be reached within the available bandwidth, all lower priority class data elements are dropped, as noted above.

Accordingly, the data element transmission will be adaptive to the available bandwidth, with a reduction of a transmission of data elements of lower priority classes if the available bandwidth is small or is reduced, and with transmitting data elements of a larger number of priority classes or of all priority classes, if the available bandwidth is large or is increasing.

In one example the transmitter controller transmits data elements of respective priority classes in groups before turning to another priority class, the number of data elements of the groups being determined by the respectively required buffer fill levels. Alternatively, the transmitter controller adjusts a transmission rate of the data elements of each of the respective priority classes for maintaining the associated buffer fill levels, for example a certain number of data elements per second.

The rate of transmission of data elements of each respective priority class will depend on the length of the data elements, the reproduction speed of the data elements at the receiving device, and possibly on further factors. To adjust the transmission rate of the data elements, the transmitter controller in one example compares a desired or target buffer fill level for a certain priority class with an actually achieved or estimated buffer fill level of that priority class at the receiving device. If the desired buffer fill level is higher than the achieved buffer fill level, the transmitter controller increases the transmission number and/or rate of data elements of this data elements of this data element class and, on the other hand, if the desired buffer fill level is smaller than the achieved buffer fill level, the transmitter controller reduces the transmission number and/or rate of data elements of the priority class under consideration.

The buffer fill levels, i.e. targets, for the respective priority classes in one example are constituted by predetermined values, e.g. are predetermined for a data stream under consideration, such as noted in a header file of the data stream, or are determined on the basis of the characteristics of the transmission medium and/or the receiving device.

According to another example the buffer fill levels are varied over time, i.e. during the progression of the transmission of the video stream. During a start-up condition of streaming or during a re-buffering event, the buffer fill levels may initially be kept small and gradually increased with the lapse of transmission time, in order to improve start-up or re-buffering behaviour of the data streaming application.

The target buffer fill levels indicate a certain number or amount of data corresponding to data elements of the priority classes and thus are set to correspond to respective playout lengths of time of the data elements of each individual priority class. According to an example, the playout length of time thus the buffer fill levels are selected to decrease with decreasing priority. Thus, a playout length of time of data elements of a higher priority class is set larger than a playout length of time of data elements of a lower priority class. Setting the buffer fill levels in this way improves the behaviour of the data stream transmission in an environment with temporary interruptions, as a longer playback length of time for data elements of higher priority class is available as compared to data elements of lower priority classes. During a temporary interruption the quality of the data stream reproduction will slowly degrade, as first buffers for lower priority classes at the receiver device are running empty, leaving only data elements of the higher data element classes for reproduction.

According to another example, link loss duration determining means are provided for determining durations of link losses during data streaming within a predetermined time period, and for computing a mean link loss duration. The playout lengths of time can then be selected based on the computed mean duration of a link loss, in order to adapt the data streaming to the channel characteristics. In another example the playout length of time of a data element class with the highest priority is set to match or exceed the maximum detected link loss duration during the predetermined time period. This allows a continuation with the data streaming during link losses at least based on highest priority data elements.

In a further example the buffer fill level detector receives information on buffer fill levels at the receiving device via messages for example sent periodically from the receiving device to the transmitting device. Alternatively or in addition thereto, the buffer fill level detector may estimate the buffer fill levels at the receiving device, based on the transmitted amount of data for each buffer and the reproduction speed of data at the receiving device.

In another example a predetermined number of priority classes is defined, with each of the priority classes being of different significance to the data streaming application. For example, a highest priority class could be defined for all data elements having crucial importance to the data streaming application, e.g. as they contain framing information, or other information required for the data stream reproduction at the receiving device. Further lower priority classes are defined for data elements with gradually lower importance for the data stream reproduction at the receiving device.

Also, data elements being required at the receiving device for decoding other data elements can be classified into a higher priority class as compared to data elements which require another data element for being decodable at the receiving device, in order to avoid transmission of data elements which cannot be decoded at the receiving device due to the absence of information from data elements they depend on. Moreover, the data elements may be classified into the priority classes based on importance of the informational content for a user receiving the reproduced data stream. For example, data elements having informational content of high relevance, such as audio information receive a higher priority then data elements having for example video content. Still further, audio data elements may be classified into different priority groups based on the type of audio information. Data elements of an audio stream having audio information detected as being speech information may receive a higher priority, whereas data elements being detected as containing background or pause information may receive a lower priority. Similarly, video data elements with large motion content may receive higher priority values as compared to data elements having lower motion information.

In the following further examples of the elements shown in FIG. 1 will be outlined in further detail. It is noted that the following constitute examples only and should not be construed as limiting the application.

The transmitting device 100 may generally be any kind of data processing device with the capability of providing a data stream to a receiving device or a number of receiving devices. For example, the transmitting device may be a server connected to a computer network and be adapted to provide one or a plurality of different data streams to one or a plurality of different receiving devices or clients. In an example the transmitting device is a web-server, capable of providing content to clients upon request, for example by using HTML or XML data formats or any other kind of communication protocols. Preferably, the transmitting device 100 comprises a large data store or is connected to such a large data store or database for having access to information to be streamed to users. Further, the transmitting device preferably comprises a central processing unit or a plurality of interconnected central processing units adapted to react to client request and to provide data streams via the network to the clients.

A data stream may be any kind of data collection transmitted to a receiving device. The data stream may comprise video information, audio information, combinations of both or any other kind of data, for example complex 3-dimensional rendered objects or similar.

To reduce the required bandwidth for transmitting the data stream to the receiving device any kind of coding or compression technique may be applied, such as compression techniques of the H.263 or MPEG standards, or any other kind of streaming screen providing a sequence of data elements, with or without mutual interdependencies. The transmitter controller 101 and the buffer fill level detector 102 may be at least partially realised in software, with corresponding code instructions of the transmitter controller and the buffer fill level detector being stored in one or more memories, accessible by the central processing unit of the transmitting device so that the central processing unit is enabled to retrieve the respective coded instructions to execute the functionality of the transmitter controller and buffer fill level detector, as outlined above.

Alternatively or in addition thereto the above elements may at least partially be realised as dedicated hardware circuits. As one example the transmitter controller may comprise a codec or compression unit, constituted by a hardware circuit, which handles the computationally intense operations of decoding or compression of information of the data stream.

The receiving device may be any time of computing device, including personal computers, laptop computers, mobile computing devices, personal digital assistance or mobile telephones. The receiving device 110 preferably is equipped with means for receiving and decoding the data stream from the transmitting device and to appropriately reproduce the data stream for presentation to a user of the receiving device. Additionally, in an example the receiving device comprises a buffer fill level reporter, reporting buffer fill levels of the receiving device for use by the buffer fill level detector at the transmitting device.

The elements of the receiving device may at least partially be realised in software or hardware, with coded instructions specifying the respective functionality of the receiving device being stored in one or more memories at or accessible by the receiving device.

The data elements may be any collection of a portion of the data of the data stream. For example, the data stream may be partitioned into data elements with the same or variable size during a coding or compression operation at the transmitting device. Alternatively, the data stream may be partitioned into data elements before or after a coding or compression operation. The data elements may have different types of content, e.g. data describing the structure of the data stream or data for presentation to a user. Moreover, the data elements may be grouped into larger entities, such as frames, data packets for transmission via a packet switched network, and similar.

The transmission of the data elements from the transmitting device 100 to the receiving device 110 illustrated in FIG. 1 at 150 may be accomplished via any kind of transmission medium, including dedicated communication links, connectionless connections, computer networks, wire line or wireless links and similar. For example, the transmission may involve the internet, local area networks, at-hoc networks, wireless networks such as according to the GSM, UMTS, D-AMPS, 3G standards and similar, alone or in combination.

According to another example, the streaming service can be provided in a client server environment, the server streaming the data stream to the client or a plurality of clients. According to an alternative a proxy is provided between the server and the client, for delivering the data stream to the client(s), e.g. with a high bandwidth transmission capability between the server and the proxy and a lower bandwidth transmission between the proxy and the client. In this case the proxy may at least provide some of the above and below described functionalities for prioritising the data elements of the data stream for transmission to a receiving device, i.e. to at least some extent assume the functionalities of the transmission device. However, it is also possible that the proxy only forwards data elements appropriately handled by the sever acting at least partially as the transmission device.

In the following a further embodiment of the invention will be described with regard to FIG. 2.

Figure 2:
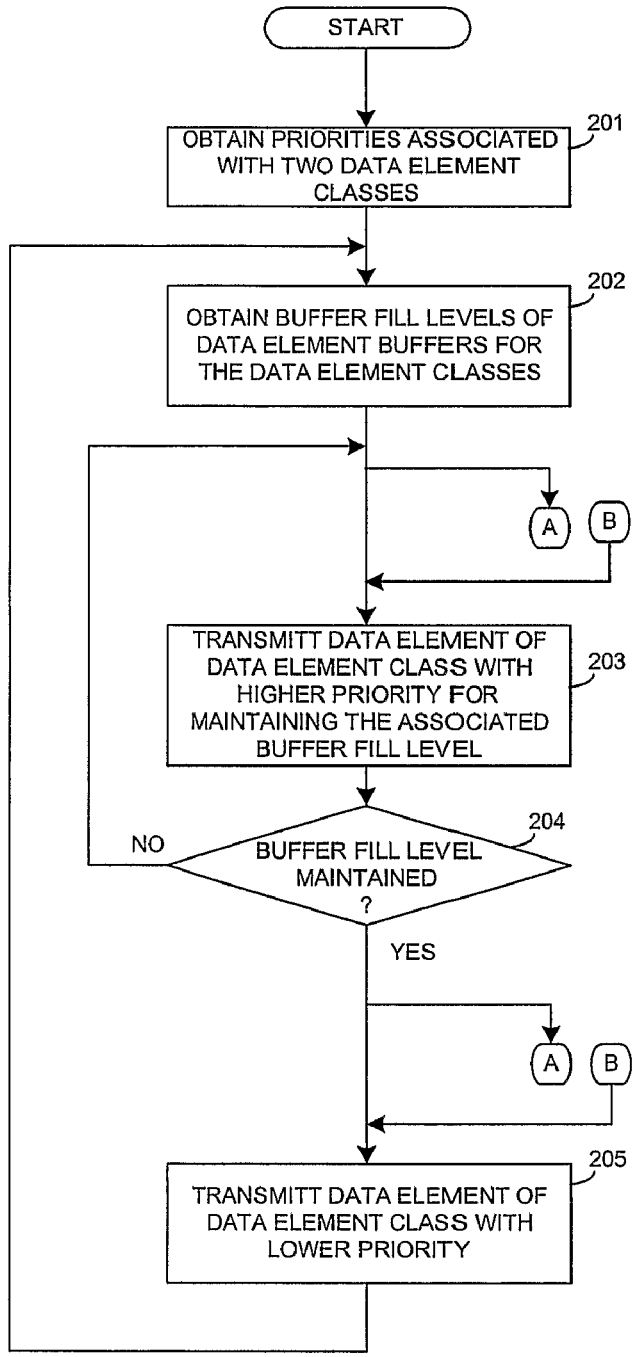
FIG. 2 illustrates operations for transmitting data elements of a data stream based on priority to a receiving device according to an embodiment of the invention.

FIG. 2 illustrates operations for transmitting data elements of a data stream based on priority to a receiving device according to another embodiment of the invention, particularly illustrating operations for controlling the buffer fill levels. The operations of FIG. 2 may be carried out using the hardware arrangement of FIG. 1, however, FIG. 2 is not limited thereto.

The embodiment of FIG. 2 illustrates the transmission of data elements of a data stream from a transmitting device to a receiving device into priority classes, the first priority class having a higher priority than the other. The embodiment illustrates how the data elements of the two priority classes are transmitted while maintaining associated buffer fill levels at the receiving device, if possible.

In a first operation 201 the priorities associated with the two packet classes are obtained. As briefly noted before, the priorities assigned to the data element classes may be selected on the basis of information regarding the data elements of each class, such as an importance of the data elements for the data stream transmission, e.g. decodability of the entire data stream at the receiving device. For example, a data element may contain basic information specifying the characteristics of the data stream including the partitioning into data elements, transmission rates and similar, and the absence of the availability of this information at the receiving device may make it difficult or impossible to decode the data stream. Accordingly, such data elements will be grouped in the priority class with the higher priority value, in order to fulfil the basic requirements of data streaming.

Alternatively, or in addition thereto the priority value of authority class may be set based on information on the importance of the informational content of the data element for a user handling the data stream at the receiving device. For example, in a video sequence or audio sequence certain data elements of the data stream may contain important notifications or indications for the user and these data elements may correspondingly be associated with a high priority. Likewise, data elements with information of lesser importance, such as data elements containing purely image data or audio data containing background noise may be associated with a low priority, as their content would neither impair a handling of the data stream at the receiving device, nor severely degrade the quality of the data stream as perceived by the user.

The priority values of the element classes may be obtained by appropriately processing the above additional information on the data elements, either individually for each data element, in order to determine a priority class, or for pre-grouped data elements.

Additionally, a priority of a data element and thus the classification of the data element into a priority class may be determined depending on a decodability of the data element, the decodability indicating the extent to which the data element is potentially decodable at the receiving device. For example, a data element may require information of another data element in order to be decodable at the receiving device and therefore the decodability may depend on the availability of the other data element at the receiving device.

The priorities may be obtained dynamically during data stream transmission or may be predetermined values, e.g. associated with the individual data elements.

In an operation 202 the buffer fill levels of the packet buffers for the packet classes are obtained, e.g. by the buffer fill level detector 102 of FIG. 1. According to the present example the buffer fill levels at the receiving device are estimated at the transmitting device without receiving corresponding buffer fill level reports from the receiving device.

The buffer fill levels at the receiving device are estimated based on the reproduction speed of the data stream and the number of data elements transmitted to the receiving device or an amount of data transmitted to the receiving device. For example, with a given reproduction speed at the receiving device, and based on a particular point in time of starting the reproduction at the receiving device, the buffer fill level detector determines a number of transmitted data elements at the receiving device awaiting reproduction and, based on the size of the data elements a buffer fill level can be determined. The target buffer fill level can be set corresponding to a number of data elements in the buffer, or may be set on the basis of an amount of data in the respective buffer. Still further, the target buffer fill level may be determined based on a playout length of time, i.e., a desired time period of continuing reproduction of the data stream on the basis of the data elements in the particular buffer without further input to the buffer.

Still further, the buffer fill levels may be determined on the basis of a time stamp of the data elements indicating a playback point in time at the receiving device for the data elements. With a known transmission time from the transmitting device to the receiving device or estimation thereof, the buffer fill level detector can derive the number of data elements or the amount of data in each priority class based on the time of transmission of each respective data element and a scheduled playback point in time of the data elements. In other words, the buffer fill level detector can determine all data elements that have arrived in each priority class at the receiving device and are awaiting reproduction.

Alternatively or in addition thereto the buffer fill level detector may use acknowledgement information from the receiving device, indicating the identities of the data packets which were successfully received and/or decoded at the receiving device.

In an operation 203 a transmitter controller such as the transmitter controller 101 of FIG. 1 transmits data elements of the packet class with the higher priority of the two priorities, for maintaining an associated buffer fill level. The requirement to transmit data elements of the higher priority class can be determined by comparing the desired buffer fill level for this priority class with the buffer fill level achieved on the basis of a current of transmitted data elements of the priority class. In case the number of presently transmitted data elements of the higher priority packet class is insufficient for maintaining or reaching the associated buffer fill level, further data elements of the higher priority class are transmitted.

Thus, in an operation 204 it is determined whether the buffer fill level is reached or maintained on the basis of the transmission of data elements of operation 203.

If in operation 204 the decision is "YES", i.e., if the buffer fill level of the highest priority class is reached or maintained, the flow continues with operation 205 and the transmitting of data elements of the data element class with the lower priority. If in the present case of two data element classes the data elements of the lower priority class have been transmitted, the entire data stream is transmittable. If in operation 205, e.g. due to bandwidth limitations, not all data elements of the lower priority class can be transmitted, data elements in the lower priority class are skipped.

The skipping of data packets of the lower priority class may follow a predetermined rule. For example, in a time sequence of data elements of the lower priority class each second data element of the lower priority class may be skipped, in order to reduce a variation of the quality of the data stream representation at the receiving device. Any other scheme for periodically skipping data elements of the lower priority class may be used, e.g. each third data packet may be transmitted, and so on, in order to reduce fluctuations of the video stream quality.

If in operation 204 the decision is "NO", i.e., if the buffer fill level is not reached or maintained, the flow returns to operation 203, for again transmitting data elements of the data element class with higher priority.

After operation 205, if all data packets of the packet class with lower priority have been transmitted, the flow of operations returns to operation 202, for again obtaining the buffer fill levels of the data element buffers for the data element classes.

If in operation 204 the buffer fill level of the higher priority class cannot be reached or maintained, even if continuously transmitting data elements of the higher priority class, the flow of operations will never enter operation 205, leading to a dropping of the data elements of the lower priority class.

The embodiment of FIG. 2 illustrates the transmission of data elements of different priority classes in accordance with their priority, adapting to the available bandwidth of the transmission in a medium. If the available bandwidth is exhausted by transmitting data elements of the higher priority class, the data elements of the lower priority class will be a skip. Only if the buffer fill level associated with the higher priority class can be reached or maintained by transmitting data elements of the higher data element class, the transmitting device will also transmit data elements of the lower priority class.

Event though the embodiment of FIG. 2 only illustrates the presence of two priority classes, a larger number of priority classes is possible, with the flow of operations gradually leading to the transmission of data elements of lower priority classes, in accordance with the available bandwidth.

If the available bandwidth is exhausted, with the transmission of data elements in one priority class for maintaining or reaching the associated receiver buffer fill level, all lower priority classes will be dropped.

In the following a further embodiment of the invention will be described with regard to FIG. 3.

Figure 3:
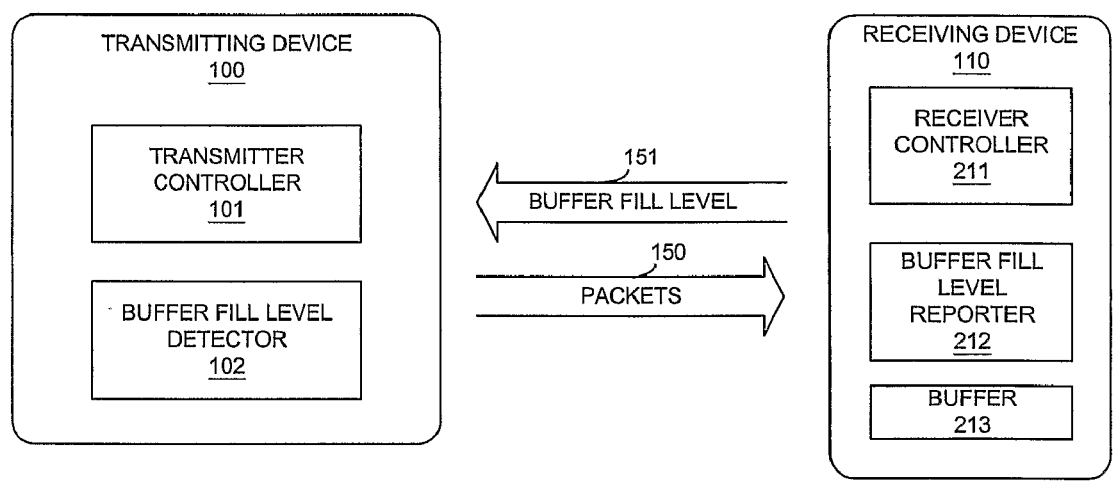
FIG. 3 illustrates elements of a hardware arrangement for transmitting data elements based on priority to a receiving device according to another embodiment of the invention, particularly illustrating a buffer fill level report from the receiving device.

FIG. 3 illustrates a hardware arrangement for transmitting data elements of a data stream based on priority to a receiving device, similar to the embodiment shown in FIG. 1. Elements similar or identical to the elements illustrated in FIG. 1 are denoted with the same reference numerals and a repeated description thereof will be omitted.

In the embodiment of FIG. 1 it was assumed that the transmitting device estimates the buffer fill levels at the receiving device. In contrast thereto, according to the embodiment shown in FIG. 3, a buffer fill level detector 202 at the transmitting device 100 obtains information on the buffer fill levels directly from the receiving device 110, as illustrated by the arrow 151. Preferably, the buffer fill levels of each of the priority classes are transmitted from the receiving device to the transmitting device, e.g. periodically, or upon request from the transmitting device. For transmitting the buffer fill level report from the receiving device to the transmitting device, the same transmission medium as used for the data element transmission may be used. The buffer fill level report may contain information on a buffer fill level for each priority class and a time stamp of indicating a time of measurement of the buffer fill levels.

The receiving device according to the embodiment of FIG. 3 comprises a receiver controller 211 for receiving data elements of a plurality of data element classes to their priority. Further, the receiving device comprises a plurality of data element buffers 213, provided for storing the data elements of each of the data element classes. The receiving device may for this purpose comprise a plurality of buffers or a single buffer appropriately portioned for each of the priority classes. Upon receiving the data elements at the receiving device, they are preferably stored in the respective buffers in accordance with the priority of the arriving data elements. Further, the receiving controller then retrieves the data elements from the buffers in accordance with their playback time stamps or sequence numbers, in order to provide an appropriate reproduction of the data stream.

Further, the receiving device 110 comprises a buffer fill level reporter 212 for reporting information on buffer fill levels of the data element buffers for the plurality of data element classes to the transmitting device, for enabling the transmitter controller 101 of the transmitting device to transmit data elements of a data element class with a higher priority so that the associated buffer fill level is reached and, if the buffer fill level of the data element class with the higher priority is reached, two transmit data elements of a data element class with a lower priority. The buffer fill level reporter may provide buffer fill level reports on a regular basis or upon request from the transmitting device, as noted before.

In the following a further embodiment of the invention will be described with regard to FIG. 4.

Figure 4:
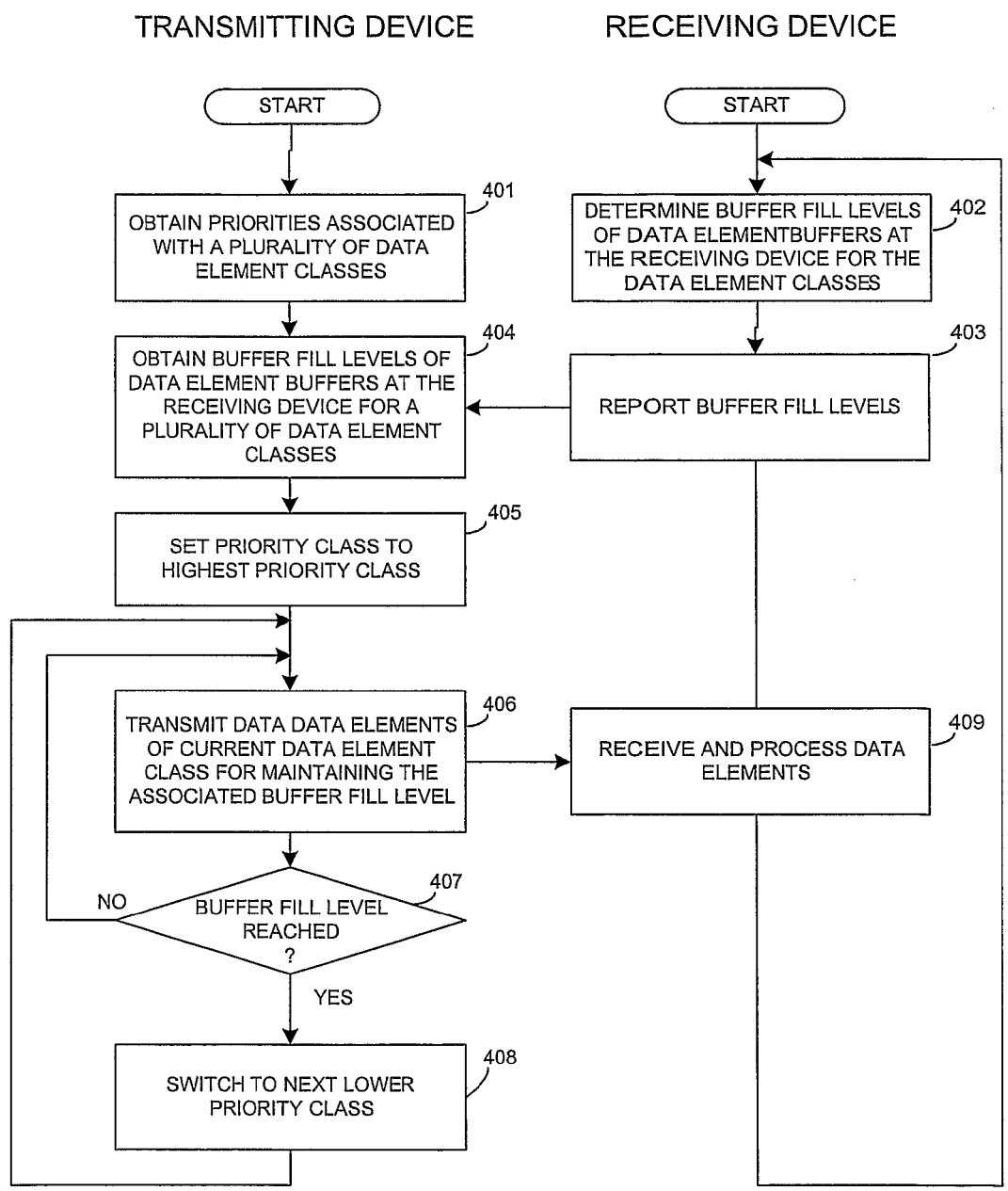
FIG. 4 illustrates operations for transmitting data elements based on priority to a receiving device according to another embodiment of the invention, particularly illustrating obtaining information on buffer fill levels.

FIG. 4 illustrates operations for transmitting data elements of a data stream based on priority from a transmission device to a receiving device, and particularly outlines operations for effectively utilizing an available transmission bandwidth for data streaming. The operations of FIG. 4 may be carried out using the hardware arrangement of FIG. 1 or FIG. 3, however, FIG. 4 is not limited thereto.

In a first operation 401 at the transmitting device priorities associated with a plurality of packet classes are obtained. As noted before, the priorities may be predetermined or may be determined on the fly, i.e. during a transmission of the data stream. Moreover, the data elements may be grouped into the different priority classes based on their type, their informational content and/or their dependency based on other data elements, the other data elements being required for decoding at the receiving device. In one example, the priorities of audio data elements of a stream are associated with a higher priority than video data elements.

Further, in a video streaming application according to the MPEG standard, comprising I-frames, P-frames and B-frames, I-frames are associated with a highest priority, P-frames with a second highest priority and B-frames with a lowest priority. Further, priority ranges for P-frames and B-frames can be further subdivided into priority classes according to their position in the video stream, i.e. the distance to a preceding I-frame. The lower the distance to the preceding I-frame, the higher the priority class. Each distance value may be associated with its own priority class, or several distance values may also be grouped into one priority class.

The priorities of the data elements may vary during streaming, i.e. the priorities assigned and therefore the grouping of the data elements may be adjusted during the progression of the data streaming, e.g. based on a scheduled reproduction time at the receiving device for a particular data element, the availability of other data elements at the receiving device and further factors.

At the receiving device, in an operation 402 buffer fill levels of data element buffers of the receiving device for the data element classes are determined. The determination operation may be performed by a buffer fill level reporter such as the buffer fill level reporter 212 of FIG. 3.

In an example a buffer is provided for each of the priority classes of the data stream. Information on the priority classes may be obtained from the transmitting device during a data stream start up procedure, or may be predetermined for a certain type of streaming application, type of data stream. Further, the number of priority classes may depend on user settings, enabling a user to take influence on the characteristics of the data streaming operations. During a start up procedure of the data streaming application a user could be interrogated regarding desired characteristics of the data streaming, including a number of priority classes and further factors, such as a basic transmission bandwidth of an interface or modem, and similar.

During operation, the received data elements are categorized by their priority class and correspondingly buffered in the buffers at the receiving device, e.g. under control of a receiver controller such as the receiver controller 211 shown in FIG. 3.

The determination operation 402 of the buffer fill levels of the individual data element buffers may take place periodically, e.g. once per second any other time frame. In an example a buffer fill level corresponds to a number of data elements stored in the respective buffer, or the buffer fill level may be provided as a percentage of the entire buffer for the priority class filled by data elements. Still further, in another example the buffer fill levels correspond to respective playout length of time of the buffers, i.e. an available playout length of time without further input of data elements. For example, a buffer fill level may correspond to a playout length of time of two seconds or any other playout length of time.

According to an alternative, the buffer fill levels are determined upon request from the transmitting device, in which case the receiving device receives a corresponding buffer fill level determining instruction from the transmitting device.

In an operation 403 the receiving device reports the buffer fill levels to the transmitting device, where the buffer fill levels are received in an operation 404. Together with the buffer fill levels the receiving device may report a current data rate or bandwidth of the transmission of data elements from the transmitting device to the receiving device. This data rate or bandwidth may be used by the transmitting device to further adjust the transmission of the data stream, by adjusting target buffer fill levels, prioritisation of data elements and similar.

Alternatively, or in addition thereto the transmitting device may estimate in operation 404 the buffer fill levels of the receiving device, as outlined with regard to previous embodiments.

In an operation 405 the transmitting device then sets the current priority class to the highest priority class, in order to first attend to the transmission of data elements of the highest priority class.

In an operation 406 at the transmitting device, data elements of a data element class with the highest priority are transmitted for maintaining the associated buffer fill level of the highest priority class, as described with regard to previous embodiments.

In an operation 407 the transmitting device determines whether the target buffer fill level of the highest priority class is reached, e.g. by comparing the reported buffer fill level from the receiving device with the target buffer fill level for the highest priority class. If in operation 407 the decision is "NO", indicating that the desired buffer fill level for the highest priority class at the receiving device has not yet been reached, further data elements of the highest priority class are transmitted.

If in operation 407 the decision is "YES", indicating that the buffer fill level for the data elements of the highest priority class is reached, in an operation 408 the transmitter controller switches to the next highest priority class. For example, the transmission controller of the transmitting device may switch to a transmission of a data element of the second highest priority class. The switching may include switching from a buffer of data elements of the highest priority class at the transmitting device to a buffer of data elements of the second highest priority class. If in operation 407 the decision is "NO", indicating that the buffer fill level for the data elements of the highest priority class is not yet reached, further data elements of the highest priority class are transmitted and/or a transmission rate of these data elements is raised.

After operation 408 the flow returns to operation 406, and data elements of the current packet class, i.e., the second highest priority class are transmitted for maintaining the associated buffer fill level. In operation 407 it is again checked whether the associated buffer fill level is reached, and if not, further data elements of the current data element class, i.e., the second highest priority class are transmitted in operation 406, until the buffer fill level is reached. Thereafter, operations again turn to operation 408, switching to the next highest priority class and the flow returns to operation 406.

The data elements transmitted in operation 406 are received at the receiving device in operation 409 and correspondingly processed to present the data stream, e.g. for a user.

Thus, the transmitting device successively returns to a transmission of data elements of successively lower priority classes, thus transmitting data elements of gradually lower importance. If the transmission bandwidth is sufficient for transmitting all data elements of all priority classes, the entire data stream will be transmitted to the receiving device. However, if the available bandwidth is insufficient for transmitting all data elements, the transmitting device will transmit data elements of respective priority classes, as noted above, until the available bandwidth is exhausted. In this case at one point in time in operation 407 it will be determined that a current buffer fill level can not be maintained or reached, as the bandwidth is exhausted, and in this case, the transmitting device will not be able to switch to a further next lower priority class, leading to a dropping of all data elements of this priority class and further lower priority classes.

The operations of FIG. 4 illustrate the transmission of a certain number of data elements, for example in a group of data elements determined in view of a certain reduction time period, a certain amount of data, or interrelation between data elements of the data stream, as noted before.

While FIG. 4 shows a certain time sequence of operations, it is explicitly noted that variations of this time sequence of operations are possible. For example, operation 404, the determination of buffer fill levels, may be carried out repeatedly, e.g. within the loop of operations 406, 407 and 408, and likewise, operation 401 for obtaining priorities associated with the data elements may be carried out at an arbitrary point in time, e.g. in association with operation 406. In this case a priority of a data element and thus a categorisation into one of the priority classes may be determined for each data element individually.

In the following a further embodiment of the invention will be described with regard to FIG. 5.

Figure 5:
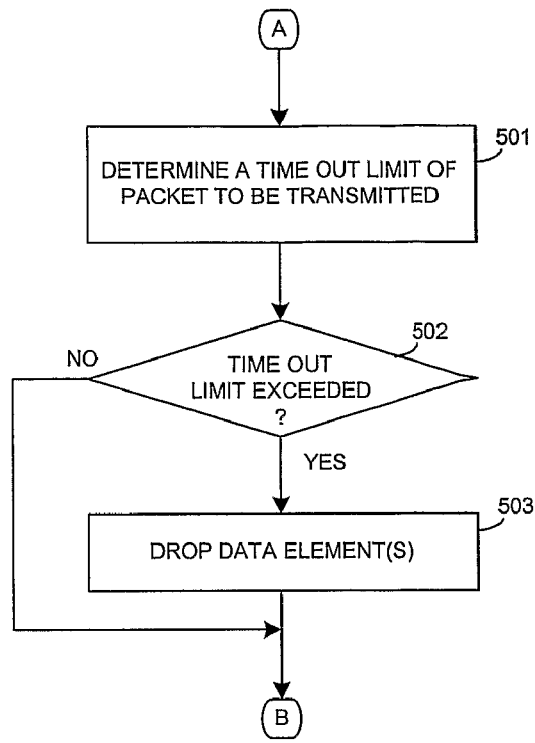
FIG. 5 illustrates operations for transmitting data elements based on priority to a receiving device according to another embodiment of the invention, particularly illustrating operations for dropping data elements having exceeded their time out limit.

FIG. 5 illustrates operations for transmitting data elements based on priority to a receiving device particularly illustrating further operations for reducing a number of data elements for transmission, in order to reduce bandwidth requirements.

In a data stream each data racket must be reproduced at the receiving device at a certain point in time or at a certain position within a time sequence of data element of the data stream. Accordingly, if a data element is not available at the receiving device for reproduction at the specified point in time or specified position within a sequence of data elements, the data element becomes useless for the data stream reproduction and therefore need not be transmitted from the transmitting device to the receiving device.

Accordingly, in the present embodiment a timeout limit is determined and data elements exceeding the timeout limit are dropped from the transmission queue.

Operations of FIG. 5 may start at an exit point A in FIG. 12, i.e., after operation 202, prior to the transmission of the data elements be receiving device. However, it is also possible that the consideration of the time out limit is performed at another point in time.

In an operation 501 at a transmitter controller such as the transmitter controller 101 of FIG. 1 determines a timeout limit of a data element for transmission. The timeout limit may be stored in association with the data element of the data stream or may be derived from a position of the data element in the data stream and known progression of the reproduction of the data stream at the receiving device. Preferably, the decision to transmit or drop a data element will be based on the timeout limit and an expected transmission time of the data element and appropriate decoding time of the data element at the receiving device. Operation 501 may be carried out immediately prior to a transmission of a data element, or at any other point in time, for removing "aged" data elements.

Thereafter, in operation 502 it is determined whether the timeout limit is exceeded for the data element under consideration. If the decision is "YES", the data element under consideration is removed from a transmission queue, i.e., discarded. If in operation 502, the decision is "NO", the operation 503 is skipped, i.e. the data element is not removed the transmission queue and maintained for transmission.

Thereafter, the flow may continue at an entry point B in FIG. 2, i.e. may proceed with operation 203 and/or 205 of FIG. 2.

The present embodiment, which may be combined with any of the other embodiments, assures that data elements that cannot be transmitted in time to the receiving device are dropped and corresponding transmission bandwidth is saved for the transmission of other data elements. A combination of the above embodiments for priority based transmission under consideration of buffer fill levels and the timeout limit allows improving further a presentation quality of the data stream at the receiving device.

In the following a further embodiment of the invention will be described with regard to FIG. 6.

Figure 6:
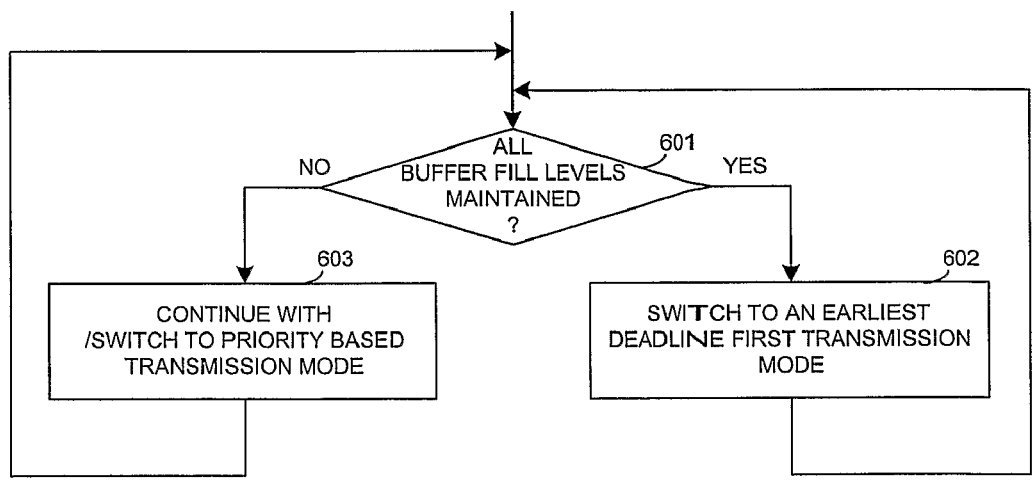
FIG. 6 illustrates operations for transmitting data elements based on priority to a receiving device according to another embodiment of the invention, particularly illustrating a switching between a priority-based transmission and earliest dead time transmission.

FIG. 6 illustrates operations for transmitting data elements to a receiving device based on priority, particularly illustrating operations to further adapt to an available transmission bandwidth.

An earliest dead time first (EDF) algorithm is designed to transmit data elements according to their time of presentation at the receiving device. Generally, this will lead to a sequential transmission of data elements for sequential presentation at the receiving device. Moreover, transmitted packets may be marked and kept within a transmission queue for retransmissions until they cannot be transmitted timely. Then they are dropped from the queue. The dropping condition depends on the presentation time stamp and the transmission time duration for transmitting the data element from the transmitting device to the receiving device. Whenever it is possible to completely transmit a data stream, the earliest dead time first algorithm (EDF) is useful. The EDF transmission principle leads to a highest quality presentation of the data stream at the receiving device, if the available bandwidth is large enough to transmit the all data elements of the data stream. However, if the transmission bandwidth is reduced and some data elements must be skipped from the transmission queue, the presentation quality quickly degrades.

The present embodiment uses the advantageous characteristics of the earliest dead time first transmission scheme during times with an availability of transmission bandwidth sufficient for transmitting the entire data stream, and switches to the priority based transmission scheme upon insufficient transmission bandwidth.

In a first operation 601 it is determined at the transmitting device, e.g. by the transmitter controller 101 shown in FIG. 1 or 3, whether all buffer fill levels can be reached or maintained.

Operation 601 may for example be carried out in association with operations 204 or 407 of FIGS. 2 and 4, respectively, or at any other point in time doing data streaming.

If in operation 601 the decision is "YES", i.e., if all buffer fill levels can be maintained, this indicates that the sufficient transmission bandwidth for transmitting the entire data stream is available, and therefore in operation 602 the transmission mode of the transmitting device switches to an earliest deadline first transmission mode, in which the data elements are transmitted in accordance with their presentation time or sequential position in the data stream.

Thereafter, the flow returns to operation 601, e.g., it is continuously checked whether all buffer fill levels can be maintained.

If in operation 601 the decision is "NO", indicating that not all buffer fill levels can be maintained, i.e. that not sufficient bandwidth for transmitting all data elements of the data stream is available, in an operation 603 the transmitting device continues with or switches to the priority-based transmission mode under consideration of buffer fill levels. In other words, if the transmitting device was in the EDF transmission mode, it is switched back to the priority-based transmission mode, and, if the transmitting device was already in the priority-based transmission mode, the transmission device remains in the priority-based transmission mode. Thereafter, operations continue with operation 601, i.e., it is again checked whether all buffer fill levels can be maintained.

The embodiment of FIG. 6 allows an improved adaptation to the available bandwidth of the transmission medium, and allows adapting to changing conditions of the transmission medium. If sufficient bandwidth is available, the transmission mode is switched to the low overhead earliest dead time first transmission mode, and only in presence of insufficient bandwidth, the priority-based transmission mode using buffer fill level determination is employed.

In the following, a further embodiment of the invention will be outlined with regard to FIG. 7.

Figure 7:
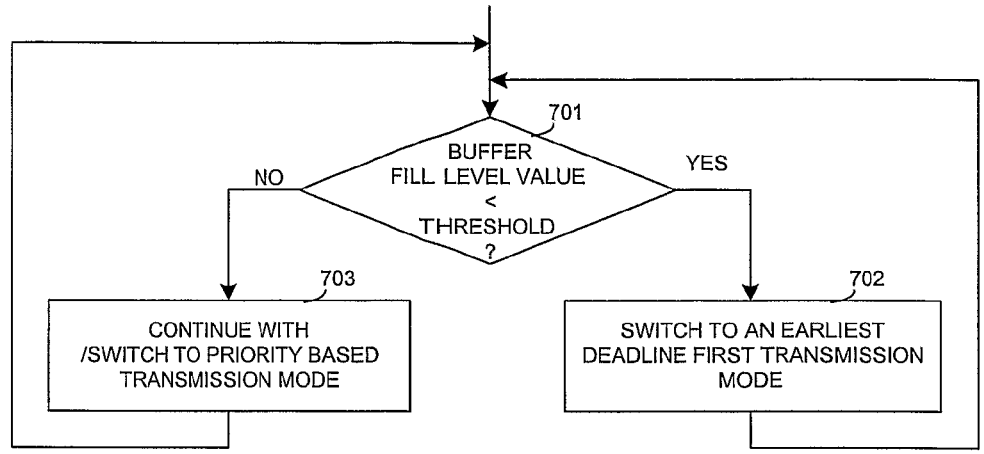
FIG. 7 illustrates operations of a method for transmitting data elements based on priority to a receiving device according to another embodiment of the invention, particularly illustrating switching between priority-based transmission and earliest dead time-based transmission.

FIG. 7 illustrates operations for transmitting data packets to a receiving device according to priority, further illustrating switching between a priority-based transmission mode and an earliest dead time first transmission mode.

The embodiment shown in FIG. 7 is similar to the embodiment shown in FIG. 6, however, in the embodiment of FIG. 7 another switching criteria is used.

In a first operation 701 it is determined whether a buffer fill level value is below a certain predetermined buffer fill level threshold. The buffer fill level value may be any value defined in association with one or more of the buffer fill levels for the individual buffers at the receiving device. In one example, the buffer fill level value is calculated as a mean buffer fill level of the data elements buffers at the receiving device and is compared to a mean buffer fill level threshold. For example, the mean buffer fill level threshold could be set to 80%, i.e., 80% average fill level of the buffers, or could be set to a certain average playout length of time of the individual data element buffers.

According to another example, the buffer fill level value can be determined based on a linear combination of the individual buffer fill levels and compared to a correspondingly selected threshold.

In any case, the applicable threshold is preferably selected such that a switching between individual transmission modes is performed at a point where the transmission modes approximately have the same performance. For example, a switching between a first transmission mode and a second transmission mode such as the earliest dead time first transmission mode and the priority-based transmission mode should be performed depending on a decision which of the transmission modes outperforms the other.

Accordingly, the selection of the predetermined threshold is such that always the best transmission mode is used.

According to another example, the threshold is dynamically adjusted in accordance with the transmission characteristics of the transmission medium, e.g. an average transmission loss duration of the transmission medium. Further, a user at the receiving device may be enabled to correspondingly select or set the threshold value.

If in operation 701 the decision is "yes", indicating that the buffer fill level value is below the threshold, it is switched to an earliest deadline first transmission mode or other transmission mode in an operation 702, as noted before.

If in operation 701 the decision is "no", indicating that the buffer fill level is above the threshold, it is continued or switched to the priority-based transmission mode, as noted with regard to the previous embodiments.

In the following a further embodiment of the invention will be described with regard to FIG. 8.

Figure 8:
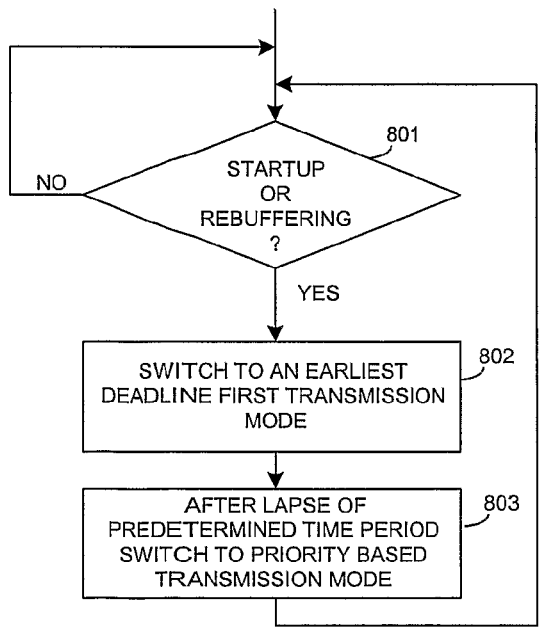
FIG. 8 illustrates operations for transmitting data elements based on priority to a receiving device, particularly illustrating operations for switching between priority-based transmission and earliest dead time-based transmission.

FIG. 8 illustrates operations for transmitting data elements to a receiving device according to priority, particularly outlining another decision criterion for switching between transmission modes.

Generally, upon starting or a streaming application or upon a re-buffering event after a transmission loss, the buffers for the data elements in the respective priority classes at the receiving device will be empty or almost empty. Accordingly, upon starting the priority-based transmission of data elements to the receiving device, the buffers at the receiving device will have to be gradually filled up with data elements. In accordance with the priority-based transmission scheme initially the buffer with the highest priority class will be filled up, then turning to gradually lower priority classes. Accordingly, upon start-up or re-buffering a data streaming application, a data stream reproduction may be of low quality, as initially only highest or higher priority data elements are available at the receiving device.

The earliest dead time first transmission mode, however, transmitting data elements in a presentation sequence, will have an improved start-up or re-buffering performance.

Therefore, according to the present embodiment it is determined in an operation 801, whether a start-up or re-buffering event took place. If in operation 801 the decision is "YES", it is switched to an earliest deadline first transmission mode, and the superior start-up performance of the earliest dead time first transmission mode is employed for an improved data stream reproduction during an initial phase of the data streaming application.

Thereafter, in an operation 803 the earliest deadline first transmission mode is maintained for a predetermined amount of time, after which the transmission mode is switched to the priority-based transmission mode outlined with regard to the previous embodiments.

Accordingly, with the embodiment of FIG. 8 during a start-up or re-buffering event, the earliest dead time first transmission mode is used for an initial phase of the streaming application, until the buffers are sufficiently filled at the receiving device and then transmission is switched to the priority-based transmission mode. The point in time for switching to the priority-based transmission mode may be appropriately selected, e.g. after the data element buffers of all priority classes are sufficiently filled.

It is noted that in the above embodiment, instead of switching to an earliest dead time first transmission mode, switching to any other transmission mode or streaming technique may be employed instead.

In the following a further embodiment of the invention will be described with regard to FIG. 9.

Figure 9:
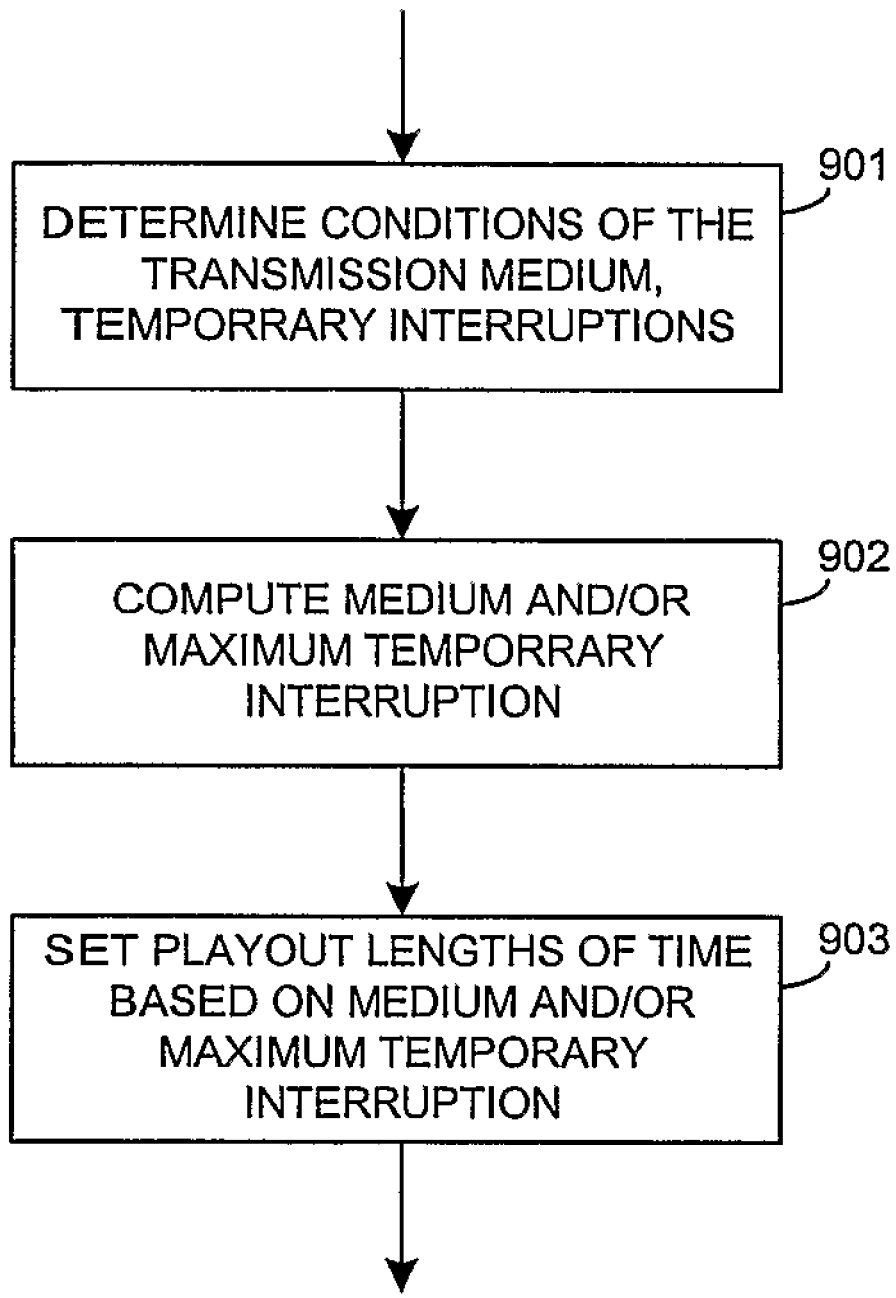
FIG. 9 illustrates operations for transmitting data elements based on priority to a receiving device according to another embodiment of the invention, particularly illustrating operations for setting desired buffer fill levels.

FIG. 9 illustrates operations for transmitting data packets according to priority to a receiving device, particularly outlining operations for determining target buffer fill levels for the individual priority classes.

Generally, the target buffer fill levels at the receiving device should be selected such that a superior presentation quality at the receiving device can be achieved for a given condition of the transmission medium. Particularly in mobile environments, where transmission losses of data elements and interruptions of transmissions are frequent, the buffer fill levels should be selected such that it is possible to cope with the data losses and transmission interruptions at minimal reduction of a presentation quality at the receiving device. Most importantly, reproducing the data stream from the buffers at the receiving device should cover transmission interruptions. Further, at times of severely degraded transmission bandwidth, the data stream should also be reproducible by using data elements from the data element buffers at the receiving device, covering a period of time with reduced refilling rate of the data element buffers.

Accordingly, in an operation 901 the conditions of the transmission medium are determined, and temporal interruptions of the transmission medium are monitored. For example, a link loss duration determining means may be provided at the transmitting device or receiving device for determining durations of link losses within a predetermined time period and for computing a mean link loss duration in an operation 902. The given time period for link loss computation may be selected to accommodate to more or less variant conditions of the transmission medium. For example, link losses could be determined during time periods of for example 20 seconds or any other time period.

In operation 902, instead of a medium duration of the link losses, a maximum expected link loss duration may be determined, i.e., a maximum link loss duration during the considered time period may be obtained.

Thereafter, in an operation 903 the playout length of time of the data element buffers may be set based on the medium link loss duration or the maximum expected link loss duration. For example, the playout length of time of the data elements with the highest priority class is set to match or exceed, by a predetermined amount, the maximum detected link loss duration during the predetermined time period or set to match or exceed, by a predetermined amount, the maximum expected link loss duration during the time period.

According to another embodiment, the target buffer fill levels may be set to small values upon a start-up condition of the streaming application or an interruption or re-buffering event after a transmission loss, and then be stepwise or gradually increased to reach the above target values. Thus, the quality of the stream reproduction upon start-up or re-buffering events can be improved, as data elements of more or ideally all priority classes are available even at an earlier point in time. With progressing time the buffer fill levels can then be set to their full values, for improved behaviour during link losses.

In the following a further embodiment of the invention will be described with regard to FIG. 10.

Figure 10:
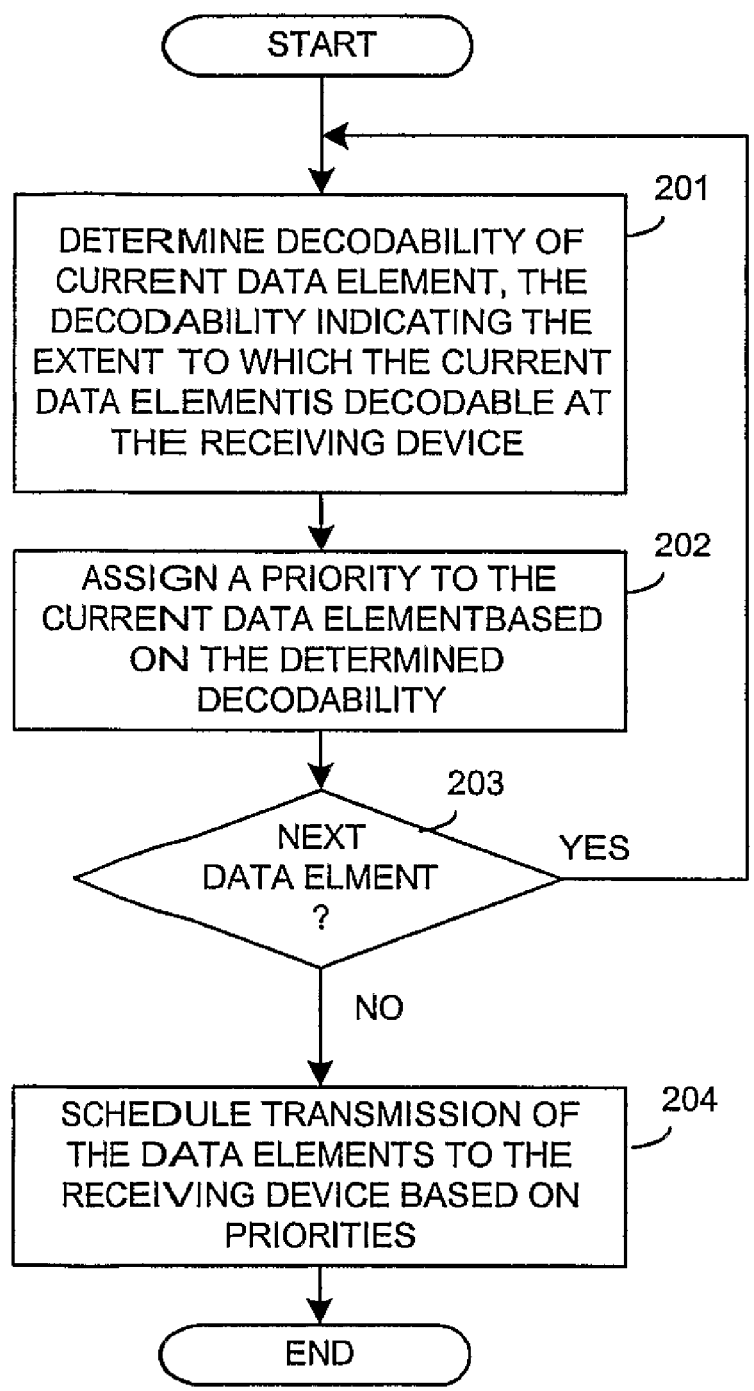
FIG. 10 illustrates elements of a method for prioritising data elements of a data stream for transmission to a receiving device according to an embodiment of the invention.

FIG. 10 illustrates operations of a method for prioritising data elements of a data stream for transmission to a receiving device and the operations of FIG. 10 may be carried using the hardware arrangement showing in FIG. 1 or 3, however, not being limited thereto.

In a first operation 1001 in the decodability of a currently considered data element is determined; the decodability indicating the extent to which the current data element is potentially decodable at the receiving device. For example, the current data element may require information of another data element in order to be decodable, and therefore the decodability may depend on the availability of the other data element at the receiving device.

In another example the decodability depends on the probability of an error free transmission of the currently considered data element to the receiving device. This probability will generally depend on the characteristics of the transmission channel or network used for transmitting the data element from the transmitting device to the receiving device, as it will be outlined further below. The error probability may be a fixed value or may be a variable entity, depending on varying conditions on the transmission medium, e.g. transmission channel or transmission network.

The decodability of the currently considered data element can be determined on the basis of information on which of a plurality of data elements was transmitted to the receiving device. This information may for example be obtained locally within the transmitting device, e.g. from a transmitter controller such as the transmitter controller 101 shown in FIG. 1. In one example the transmitter controller maintains a log of all data elements, which have been transmitted to the receiving device, i.e., which have been placed on the transmission medium in a 'send and forget' scheme. In this case it may be assumed that the data element placed on the transmission medium actually arrive at the receiving device and thus be available at the receiving device.

In addition thereto assumptions may be made on the basis of an error probability, i.e. that a data element placed on the transmission medium actually arrives uncorrupted at the receiving device. The probability may be determined heuristically, by measuring the characteristics of the transmission channel. For example, in a wireless environment signal characteristics can be measured to deduce a probability of uncorrupted transmittal of a data element to the receiving device. In a packet network measurements may be made as to the probability of loosing a data packet on its way to the receiving device.

According to another embodiment the information on which of the plurality of data elements was already transmitted to the receiving device may be obtained on the basis of an acknowledgement sent back from the receiving device to the transmitting device, indicating which of the data elements were received and error free at the receiving device, or which were successfully decodable at the receiving device.

After determining the decodability of the current data element, in an operation 1002 a priority is assigned to the current data element based on the determined decodability. In one example the priority of the current data element is set equal or proportional to the previously determined decodability of this data element.

Further, the priority of the current data element may be selected on the basis of further information regarding the data element, such as its importance for the data stream transmission, e.g. decodability of the entire data stream. For example, a data element may contain basic information specifying the characteristics of the data stream including partitioning of data elements, transmission rates and similar, and the absence of the availability of this information at the receiving device may make it difficult or impossible to decode the data stream.

Alternatively or in addition thereto the priority of the data element may be set based on information on the importance of the information content of the data element for a user handling the data stream at the receiving device. For example, in a video or audio sequence certain data elements of the data stream may contain important notifications or indications for the user and these data elements will be associated with a priority. Likewise, data elements with information of lesser importance, such as data elements containing purely image data or audio data containing background noise may be associated with a low priority, as their content will neither impair the overall handling of the data stream at the receiving device, nor severely degrade the quality of the data stream as perceived by a user.

The priority value of the data element may be obtained by appropriately processing the above additional information on the data element with the determined decodability of the data element. In one embodiment the priority is determined by multiplying the above additional information on data elements with the previously determined decodability. However, other arithmetic operations are conceivable, such as adding the additional information and the determined decodability.

Thereafter, in an operation 1003 it is determined whether another data element is present. If in operation 1003 the decision is "YES", indicating that another data element is present, the flow of operations returns to operation 1001, to determine the decodability of the next data element. In practical cases the data stream will comprise a large number of data elements, and according to one example all of the data elements of the data stream may be considered together, i.e., processed in the loop of operations 1001, 1002, and 1003.

According to another example a predetermined number of data elements is processed concurrently in the loop of operations 1001, 1002, and 1003, i.e., a predetermined amount of data can be processed concurrently. The data stream may for this purpose be arbitrarily divided into corresponding sets of data elements, or the data stream may be partitioned according to logic entities, such as data elements of a portion of the data stream with mutual dependencies. If between two groups of data elements no interrelation exists, each of the groups of data elements can be processed independently.

According to still another example, the data elements may be grouped to conform to certain time periods, i.e., in a video or audio data stream, data elements can be grouped in accordance with a certain playback period of time, such as for example one second or any other time period. The groups of data elements may be determined on the basis of a buffer size of buffer sizes available at the receiving device, so that it can always be assured that a buffer overflow at the receiving device is avoided.

If in operation 1003 the decision is "NO", indicating that a next data element is not or presently not available, the flow proceeds to operation 1004, and the transmission of the data elements to the receiving device based on the priority is scheduled, for example by the transmitter controller 101 shown in FIG. 1.

The transmitter controller may handle a group of data elements concurrently, i.e. may consider one group of data elements at a time for a transmission. The transmitter controller at first then selects data elements with the highest priority for transmission to the receiving device, and thereafter data elements with the second highest priority and so on, until either all data elements have been transmitted or the available bandwidth for the data stream transmission is exhausted. Data packets of lower priorities, which cannot be transmitted within the available bandwidth are dropped or discarded.

According to an alternative operations 1001, 1002, and 1004 may be executed sequentially for each data packet, before a next data element is considered. In this case, in operations 1004 each individual data element processed in operations 1001 and 1002 is considered for transmission.

In a practical case in the transmitter controller such as the transmitter controller 101 of the FIG. 1 will decide to transmit each data element based on the priority it received as soon as the element becomes available at the controller. Any data element having the highest priority will be transmitted immediately, so that highest emphasis is put on transmitting data packets with the highest priority. Only in case the transmitter, due to sequential processing and transmitting of the data elements, does not have any highest priority data element for transmission cueing, the transmitter controller will turn to data elements having the second highest priority. For this purpose the transmitter controller may accumulate a certain number of data elements associated with priorities, depending on the transmission bandwidth available for transmitting the data elements to the receiving device.

If the transmission bandwidth is large enough to accommodate all data packets of the data stream, the transmitter controller will be able to transmit each data element upon receiving it, no matter what priority was assigned to the data element.

However, if the transmission bandwidth of the transmission medium is lower than required for transmitting all data elements of the data stream in a timely manner, the transmitter controller will gradually accumulate data elements, as they cannot be transmitted at the same rate as they are provided through operations 1001 and 1002. It is noted that the rate of providing data elements through processing of operations 1001 and 1002 preferably matches a predetermined rate of the stream, i.e., for real time video display or audio playback.

The data elements thus received at the transmitter controller may be held in a buffer, and the transmitter controller attends to transmission of the data elements accumulated in the buffer according to their priority. As noted above the data elements with the highest priority reaching the buffer will consequently be transmitted as soon as possible, which will be at once, if no further data element having a highest priorities available, or which will be after all other previously received data elements of highest priority were transmitted. Thereafter, the transmitter controller turns to presently available data elements of the second highest priority and thereafter to data elements with gradually lower priority. Again, if the transmission bandwidth is not sufficient for transmitting all data elements of the data stream, data elements with lower priority will gradually be accumulated in the buffer, as due to the arrival of data elements having higher priority, the transmitter controller does not attend to transmitting the data elements of the lower priorities. In practical cases a certain buffer size will be provided at the transmitting device, and in practical cases, upon reaching the buffer limit at the transmitting device, data packets with the lowest priorities may be discarded from the buffer.

If after a certain period with low available transmission bandwidth the transmission bandwidth is again increased, the transmitter controller will also be able to attend to the transmission of data elements with lower priorities and the buffer will gradually be emptied.

It is noted that in addition to the priority base transmission scheme, a time limit may be introduced in association with each data element, the time limit indicating a latest time for transmitting the data element, in order to for example maintain real time playback of a data stream. Any data elements having exceeded their latest transmission time may then be discarded, as known in the art.

According to another embodiment, the transmission device 100 of FIG. 1 or 3 prioritises data elements of a data stream for transmission to a receiving device, including determining a decodability of the individual data elements, wherein the decodability indicating the extent to which the current data element is decodable at the receiving device. Then the transmission device assigns a priority to the current data element based on the determined decodability and schedules a transmission of the data elements to the receiving device based on the priority. Thus, the decodability of a data element at the receiving device can be used for determining a priority of the data element to be used when scheduling the transmission.

The decodability of the current data element may be determined using information on which of a plurality of data elements were transmitted to the receiving device. Thus, the transmission device may employ information on the availability of data elements and the receiving device for determining a decodability of a data element.

The transmitting device in another embodiment receives a feedback from the receiving device, the feedback indicating which of the data elements were received error-free. Accordingly, the transmission device may employ example acknowledgements in a packet or block transmission system for obtaining information on which of the data elements were successfully transmitted to the receiving device.

If the current data element requires a reference data element for being fully decodable at the receiving device, the decodability of the current data element is set equal to the decodability of the reference data element, when the second data element has been transmitted. Similarly, if the current data element requires multiple reference data elements for being fully decodable at the receiving device, the decodability of the current data element is determined based on the decodabilities of the reference data elements. Thus, it is possible to determine a decodability in cases of multiple dependencies between different data elements.

According to another embodiment the decodability of at least a portion of the data elements is recalculated upon transmission of a current data element. Preferably, the decodability of such data elements is recalculated, which are indicated in a decoding dependency record of the current data element, the decoding dependency record indicating all data elements requiring the current data element for decoding. Thus, the transmission device is enabled to dynamically update the decodabilities of the data elements, and may reduce complexity of the updating procedure, by referring to decoding dependency records.

The data stream may comprise independent data elements being independent from other data elements and dependent data elements being dependent on at least one reference data element, wherein the decodability of an independent data element is set to a maximum decodability and the decodability of a dependent data element is set equal to the decodability of a reference data element, when the reference data element has been transmitted. Accordingly, the transmission device may efficiently handle data streams comprising independent and dependent data elements.

According to another embodiment, the data stream comprises intra-blocks being independent from other data elements and the decodability of an intra-block being set to a maximum decodability, indicating that the intra-block is fully decodable at the receiving device; inter-blocks encoding differences between content of data element and content of a reference data element, the decodability of an inter-block being set equal to the decodability of the reference data block; and skip-blocks indicating content requiring content of a reference data block, the decodability of an inter-block being set equal to the decodability of the reference data block. Thus, for example in video streaming applications, decodability based prioritising of transmission blocks may advantageously be employed.

According to another embodiment, decodability determining means are provided to determine an average decodability of a number of data elements; to determine a decodability increase of the average decodability of the number of data elements obtainable by transmitting the current data elements; and to determine the priority of the current data element based on the decodability increase. Accordingly, the overall benefit of the transmission of a data element may be employed for assigning a priority to a data element.

It was outlined before that a priority of the data elements can be determined on the basis of the decodability of each respective element, and the priority assignment may further include information on the type or nature of the data element, see the above embodiments. To further improve the prioritisation of a data element, the priority of a data element in the present example is further selected on the basis of an overall improvement of the data stream achievable by transmitting the data element under consideration.

In a first operation an average decodability of a number of data elements is determined. The average decodability may be an arithmetic mean value of decodability of the data elements, i.e., a sum of all decodabilities of all data elements divided by the number of data elements. However, in an alternative, other decodability values reflecting the decodability of a number of data elements under consideration may be used. The number of data elements may correspond to a predetermined amount of data, i.e., a predetermined number of data elements may be grouped. Preferably, as noted before, the group of data elements is selected such that interrelations with other groups of data elements do not exist. Alternatively, however, it is also possible that a grouping of data elements according to playback times at the receiving device are used, or that the entire data stream is considered simultaneously.

Then, in another operation it is assumed that a currently considered data element is transmitted and the effect of the transmission of the currently considered data element on the average decodability of the number of data elements is determined. Thus, in this operation an increase of the average decodability by transmitting the current data element is determined.

For example, if in a sequence of data elements each individual data element depends from the previous data element in the sequence, i.e., if each data element requires information from a preceding data element for being decodable at the receiving device, and only the first data element of the sequence of data elements does not depend on another data element, the decodability of each data element except the first one is zero, as long as the information of the first data element is not available at the receiving device. Thus, a transmission of the first data element will lead to a large increase of the average decodability of all considered data elements, as only with the first data element the subsequent data elements can be decoded at the receiving device. Any other data element in the data element sequence of this example will have a lesser effect, namely only onto its following data elements.

The above example illustrates that depending on the interrelation between the data elements of the data stream the transmission of a particular data element may have a larger or smaller effect on the overall decodability of the data stream.

The average decodability increase of the group of data elements under consideration then is used in an operation 503 for re-determining the priority of the current data element based on the present decodability of the current data element and the decodability increase of the number of data elements. For example, the priority of the data element under consideration could be multiplied by a value representing the average decodability increase, e.g. a normalised average decodability increase value or based on another arithmetic operation.

According to another embodiment prioritising means may be adapted to determine the priority of the current data element based on the decodability increase divided by the size of the current data element. Accordingly, a packet size may be used to further improve the priority assigning process.

According to another embodiment the number of data elements represents data elements of a predetermined time window of the data stream or of the entire data stream.

According to another embodiment the probability of an error-free transmission of a transmission channel is estimated. Thus, in the absence for example of an acknowledgement of received error-free packet at the receiving device, the transmitting device may estimate the error probability of the transmission channel, e.g. for use in determining a decodability.

According to another embodiment, the decodability is calculated as a product of the extent to which the current data element is decodable at the receiving device and the probability of an error-free transmission of the current data packet over a transmission channel. Further, the decodability of an independent data element may be set to be equal to the determined probability, and the decodability of a dependent data element may be set equal to the determined probability times the decodability determine based on the decodability of the at least one reference data element.

According to another embodiment, the decodability of an intra-block is set equal to the probability of an error-free transmission, sets the decodability of an inter-block equal to the decodability of the reference data block multiplied by the probability of an error-free transmission; and the decodability of a skip block independent of the probability of an error-free transmission.

According to another embodiment, the decodability of the reference data element is set equal to the decodability of a data frame containing the reference data element. For reducing a required transmission bandwidth, motion estimation may be disregarded.

Even though the embodiments have been described as individual examples, it is explicitly noted that some or all of the embodiments may be combined, as desired.

Further, a program may be provided having instructions adapted to carry out any of the operations of the above embodiments. Still further, a computer readable medium may embody the program and a computer program product may comprise the computer readable medium.

The above embodiments may be used in a mixed wired and wireless environment. There are a streaming server and a wireless access network connected to the Internet, and a client is connected to the wireless access network (which may be an UMTS network).

Usually, the bit error rates over wireless connections are relatively high, so the wireless network will support automatic link level retransmissions. This is rejected in high jitter values. The Streaming Environment generally causes two different kinds of packet loss: Firstly, it is not sensible to expect Quality of Service support within the Internet. Links have to be shared with other logical connections and the inevitable congestion drops which are the basis of the congestion control within the Internet will occur. Given that the packet schedulers for real time streaming which are relevant for this paper do not transmit packets in bursts, the congestion drops will occur almost independently of each other. Secondly, the wireless link may suffer from link loss, handover or similar effects. These link failures usually have a longer duration of up to some seconds.

In another embodiment the streaming data may consist of video and audio tracks. according to the principles of Application Layer Framing, D. D. Clark and D. L. Tennenhouse, "Architectural considerations for a new generation of protocols", in Proceedings ACM Sigcom '90, September 1990, pp. 200-208 the audio data is separated into independent frames. They contain the audio data for a short time interval, and can be decoded independently of other frames. One frame may consist of more than one packet, but usually does not. The video data is considered to be encoded with a block based hybrid video codec like H.26x or MPEG. Several pictures build a Group of Frames (GOF), which can be decoded independently of other GOFs. Each GOF begins with an I-frame as an entry-point for decoding. Consecutive frames are P-frames which depend on previous frames. The Application Data Units (ADUs) of the video stream are the encoded pictures although this violates the principles of ALF, namely the requirement for out of order processing of ADUs at the application level. Technically, this could be achieved by using GOFs as ADUs. However, this requirement is a disadvantage in real time streaming applications, because the order of the frames has to be preserved. The definition of single pictures as ADUs enables their out of order processing at the protocol level.

There are two properties of each frame which are relevant for the scheduling process: its size and its timestamp indicating the temporal position within the stream. Additionally, a priority value can be assigned to describe the importance of frames.

The present embodiment combines the start-up behaviour of the EDF scheme with the robustness and the dropping properties of the priority based adaptation. The priority based adaptation, as elaborated on above, does this by defining a certain time-limit or buffer fill level for each priority class as compared to a time-out limit or size limit of other priority schemes. The priority algorithm is extended by the condition that a packet must be within these time-based limits, too. For each priority class (and its tuning parameter) the packets within the time limits are transmitted in priority order. If there are no more frames within the time limits remaining packets within the size limits are transmitted afterwards using the EDF algorithm. In comparison to the pure priority scheme the latency is reduced.

The same transmission order could be achieved by merging two priority classes. However, given that the bandwidth is not sufficient this algorithm preferably drops frames from priority class one.

Generally, the tuning parameters can be interpreted in two different ways: Firstly, if the time is divided by the Round Trip Time (RTT) of a packet it can be interpreted as the desired number of possible retransmissions in an environment with a high packet loss probability. Given that there is no need to (re)transmit either packets with higher priority values or packets with the same priority value but lesser presentation timestamps, a packet will be transmitted about a Time Limit earlier than necessary to be presented. The remaining time is available for the generation and transmission of packet loss information and retransmissions. Secondly, it defines for how long the information within a certain priority class is pre-buffered at the client. A priority class 3 could be, for example, a priority class containing I-frames of a video stream. A time parameter of n seconds would try to have the I-frames for the next n seconds of the video available in the receiver buffer before transmitting lower priority P-frames. In case of a link-failure the video presentation can be continued by displaying these I-frames. In opposition to the pure priority based adaptation the scheduler can control this behaviour independently for each priority class, e.g. configure the system to present audio and a slideshow of the I-frames for the first n seconds when the link is down, and then continue with another time of audio only. The size limit of the previous algorithm results (for variable bit rate content) in a slightly varying time limit being identical for all the priority classes. Therefore, it could be optimised for a certain duration of an outage, and tries to deliver as much priority classes as possible for that time. The embodiment can be configured for different types of outages: Short ones can be filled with higher quality presentations than longer ones. This avoids overprovisioning in the probable short case while being able to conceal longer outages, too.

As mentioned before, it is possible to transmit frames within the time limits even if they are not within the size limits. However, this may result in packet dropping at the server even if the bandwidth is not limited because of buffer overflow. Assume that k bytes are transmitted belonging to packets are transmitted being within the time limit but not fitting into the size limit. To avoid buffer overflow the transmission of other k bytes has to be restricted. Therefore, some packets of other priority classes being within the size limit only are not sent at the moment. These packets are the ones with the highest PTS, and their total size must be greater than or equal to k. If there are not enough packets within the light grey area the time limits can not be fulfilled. In that case or if a time limit does not always include one packet, packet loss may occur, because there is no more space in the buffer. An example is a buffer filled with future I-frames only, if there is no more space for the interim P-frames. Not transmitting packets being out of the size limits may truncate the time limits, but simplifies the implementation.

The invention claimed is:

1. A transmission device for transmitting data elements of a data stream based on priority to a receiving device, comprising:
a transmitter controller for obtaining data elements of a plurality of data element classes, each of the data element classes associated with a priority;
a buffer fill level detector for obtaining information on buffer fill levels of data element buffers at the receiving device for the plurality of data element classes; and
wherein the transmitter controller is adapted to transmit data elements of a data element class with a first priority for reaching the associated buffer fill level and, if the buffer fill level detector determines that the buffer fill level of the data element class with the first priority is reached, to transmit data elements of a data element class with a second priority, the second priority being lower than the first priority.

2. The transmission device according to claim 1, wherein the transmitter controller is adapted to transmit data elements of data element classes with further priorities, the further priorities being successively lower, if the buffer fill level detector determines that the buffer fill level of the data element class with a respective priority is reached.

3. The transmission device according to claim 1, wherein the transmitter controller is adapted to adjust a transmission rate of the data elements of each respective data element class for maintaining the associated buffer fill level.

4. The transmission device according to claim 1, wherein, if a buffer fill level of a data element class cannot be reached due to reaching a bandwidth limitation, the transmitter controller is adapted to drop data elements of all data element classes with lower priorities.

5. The transmission device according to claim 1, wherein the buffer fill level detector is adapted to estimate buffer fill levels at the receiver.

6. The transmission device according to claim 1, wherein the buffer fill level detector is adapted to periodically receive a message from the receiver indicating the buffer fill levels at the receiver.

7. The transmission device according to claim 1, wherein the buffer fill levels correspond to a respective playout length of time of the data elements and wherein the playout lengths of time are selected to decrease with decreasing priority.

8. The transmission device according to claim 1, including link loss duration determining means for determining durations of link losses within a predetermined time period and for computing a mean link loss duration and wherein the playout lengths of time are selected based on the computed mean duration of a link loss.

9. The transmission device according to claim 1, wherein the playout length time of the data element class with the highest priority is set to match or exceed the maximum detected link loss duration during the predetermined time period.

10. The transmission device according to claim 1, wherein the target buffer fill levels are increased with the lapse of transmission time of the data stream after a start up condition or a rebuffering event.

11. The transmission device according to claim 1, wherein the transmitter controller is adapted to determine a time out limit for each data element, the time out limit indicating a latest allowable point in time for transmitting a data element to meet real time requirements, and to drop data elements where the time out limit is exceeded.

12. The transmission device according to claim 1, wherein, if all buffer fill levels can be reached, the transmitter controller is adapted to switch to an earliest deadline first transmission mode.

13. The transmission device according to claim 11, wherein, if the transmitter controller is in the earliest deadline first transmission mode and if at least one buffer fill level cannot be maintained, the transmitter controller is adapted to switch back to the priority based transmission.

14. The transmission device according to claim 1, wherein, if a buffer fill level value is below a predetermined threshold, the transmitter controller is adapted to switch to an earliest deadline first transmission mode.

15. The transmission device according to claim 1, wherein the transmitter controller is adapted to switch to an earliest deadline first transmission mode upon a transmission start event and/or upon a rebuffering event.

16. A receiving device for receiving data elements of a data stream based on priority from a transmitting device, comprising:
   a receiver controller for receiving data elements of a plurality of data element classes, each of the data element classes associated with a priority;
   a plurality of data element buffers, provided for storing data elements of each of the data element classes; and
   a buffer fill level reporter for reporting information on buffer fill levels of data element buffers at the receiving device for the plurality of data element classes to the transmitting device, for enabling a transmitter controller at the transmitting device to transmit data elements of a data element class with a first priority so that the associated buffer fill level is reached and, if the buffer fill level of the data element class with the first priority is reached, to transmit data elements of a data element class with a second priority, the second priority being lower than the first priority.

17. A method for transmitting data elements of a data stream based on priority to a receiving device, comprising:
   obtaining data elements of a plurality of data element classes, each of the data element classes associated with a priority;
   obtaining information on buffer fill levels of data element buffers at the receiving device for the plurality of data element classes; and
   transmitting data elements of a data element class with a first priority for reaching the associated buffer fill level and, if the buffer fill level detector determines that the buffer fill level of the data element class with the first priority is reached, transmitting data elements of a data element class with a second priority, the second priority being lower than the first priority.

18. The method according to claim 17, including transmitting data elements of data element classes with further priorities, the further priorities being successively lower, if the buffer fill level of the data element class with a respective priority is reached.

19. The method according to claim 17, including adjusting a transmission rate of the data elements of each respective data element class for maintaining the associated buffer fill level.

20. The method according to claim 17, including, if a buffer fill level of a data element class cannot be reached due to reaching a bandwidth limitation, dropping data elements of all data element classes with lower priorities.

21. The method according to claim 17, including estimating buffer fill levels at the receiver.

22. The method according to claim 17, including periodically receiving a message from the receiver indicating the buffer fill levels at the receiver.

23. The method according to claim 17, wherein the buffer fill levels correspond to a respective playout length of time of the data elements and wherein the playout lengths of time are selected to decrease with decreasing priority.

24. The method according to claim 17, including determining durations of link losses within a predetermined time period, computing a mean link loss duration and selecting the playout lengths of time based on the computed mean duration of a link loss.

25. The method according to claim 17, including setting the playout length time of the data element class with the highest priority to match or exceed the maximum detected link loss duration during the predetermined time period.

26. The method according to claim 17, including increasing the target buffer fill levels with the lapse of transmission time of the data stream after a start up condition or a rebuffering event.

27. The method according to claim 17, including determining a time out limit for each data element, the time out limit indicating a latest allowable point in time for transmitting a data element to meet real time requirements, and dropping data elements if the time out limit is exceeded.

28. The method according to claim 17, including, if all buffer fill levels can be reached, switching to an earliest deadline first transmission mode.

29. The method according to claim 28, including, if at least one buffer fill level cannot be maintained, switching back to the priority based transmission.

30. The method according to claim 17, including, if a buffer fill level value is below a predetermined threshold, switching to an earliest deadline first transmission mode.

31. The method according to claim 17, including switching to an earliest deadline first transmission mode upon a transmission start event and/or upon a rebuffering event.

32. A method for receiving data elements of a data stream based on priority from a transmitting device, comprising:
   receiving data elements of a plurality of data element classes, each of the data element classes associated with a priority;
   data elements of each of the data element classes in a plurality of buffers; and
   reporter for reporting information on buffer fill levels of data element buffers at the receiving device for the plurality of data element classes to the transmitting device, for enabling the transmitting device to transmit data elements of a data element class with a first priority so that the associated buffer fill level is reached and, if the buffer fill level of the data element class with the first priority is reached, to transmit data elements of a data element class with a second priority, the second priority being lower than the first priority.

* * * * *

UNITED STATES PATENT AND TRADEMARK OFFICE
CERTIFICATE OF CORRECTION

PATENT NO. : 7,657,672 B2
APPLICATION NO. : 10/597457
DATED : February 2, 2010
INVENTOR(S) : Kampmann et al.

It is certified that error appears in the above-identified patent and that said Letters Patent is hereby corrected as shown below:

In the drawings: In Fig. 10, Sheet 8 of 8, delete Tag "201" and insert Tag -- 1001 --, therefor.

In the drawings: In Fig. 10, Sheet 8 of 8, delete Tag "202" and insert Tag -- 1002 --, therefor.

In the drawings: In Fig. 10, Sheet 8 of 8, delete Tag "203" and insert Tag -- 1003 --, therefor.

In the drawings: In Fig. 10, Sheet 8 of 8, delete Tag "204" and insert Tag -- 1004 --, therefor.

In Column 1, Line 52, delete "codes" and insert -- codecs --, therefor.

In Column 6, Line 43, delete "control 101" and insert -- controller 101 --, therefor.

Signed and Sealed this
Twenty-fourth Day of July, 2012

David J. Kappos
*Director of the United States Patent and Trademark Office*